(12) United States Patent
Huang et al.

(10) Patent No.: US 12,308,750 B2
(45) Date of Patent: May 20, 2025

(54) LLC RESONANT TOPOLOGY CONTROL CIRCUIT BASED ON FLYBACK CHIP

(71) Applicant: SHENZHEN FAHOLD ELECTRONIC LIMITED, Shenzhen (CN)

(72) Inventors: Huiteng Huang, Shenzhen (CN); Zhuanhong Wu, Shenzhen (CN); Jiafei Lin, Shenzhen (CN)

(73) Assignee: SHENZHEN FAHOLD ELECTRONIC LIMITED, Shenzhen (CN)

( * ) Notice: Subject to any disclaimer, the term of this patent is extended or adjusted under 35 U.S.C. 154(b) by 67 days.

(21) Appl. No.: 18/016,728

(22) PCT Filed: Oct. 20, 2021

(86) PCT No.: PCT/CN2021/124992
§ 371 (c)(1),
(2) Date: Jan. 18, 2023

(87) PCT Pub. No.: WO2022/127352
PCT Pub. Date: Jun. 23, 2022

(65) Prior Publication Data
US 2023/0327563 A1     Oct. 12, 2023

(30) Foreign Application Priority Data
Dec. 14, 2020   (CN) .......................... 202011468000.6

(51) Int. Cl.
H02M 3/335    (2006.01)
H02M 3/00     (2006.01)
H02M 3/07     (2006.01)

(52) U.S. Cl.
CPC ......... *H02M 3/33569* (2013.01); *H02M 3/01* (2021.05); *H02M 3/07* (2013.01)

(58) Field of Classification Search
CPC ....... H02M 3/33569; H02M 3/01; H02M 3/07
See application file for complete search history.

(56) References Cited

U.S. PATENT DOCUMENTS 12,133,305 B2 *  10/2024  Huang ............... H02M 1/4233
2008/0094047 A1   4/2008  Huynh et al.
2015/0171754 A1 *  6/2015  Scibilia ............. H05B 45/3725
                                                  363/21.02

FOREIGN PATENT DOCUMENTS

CN       101039075 A     9/2007
CN       107769569 Y     3/2018
                (Continued)

*Primary Examiner* — Kyle J Moody
(74) *Attorney, Agent, or Firm* — Hemisphere Law, PLLC; Zhigang Ma

(57) ABSTRACT

The present disclosure relates to an LLC resonant topology control circuit base on a flyback chip, including an LLC resonant cavity, a current mode flyback chip U1, a first drive circuit, a second drive circuit, a charge pump circuit and a feedback circuit, wherein the LLC resonant cavity includes a switching transistor Q1, a switching transistor Q2, a resonant inductor L1, a resonant capacitor C1 and an output transformer T1; the switching transistor Q1 is connected in series with the switching transistor Q2; the resonant inductor L1, a primary coil of the output transformer T1 and the resonant capacitor C1 are connected in series and then are connected in parallel to the switching transistor Q2. The LLC resonant topology control circuit provided by the present disclosure has the characteristics of low cost and small volume.

4 Claims, 1 Drawing Sheet

(56) References Cited

FOREIGN PATENT DOCUMENTS

| CN | 208015594 A | 10/2018 |
| CN | 109547721 Y | 3/2019 |
| CN | 112671246 | 4/2021 |

* cited by examiner

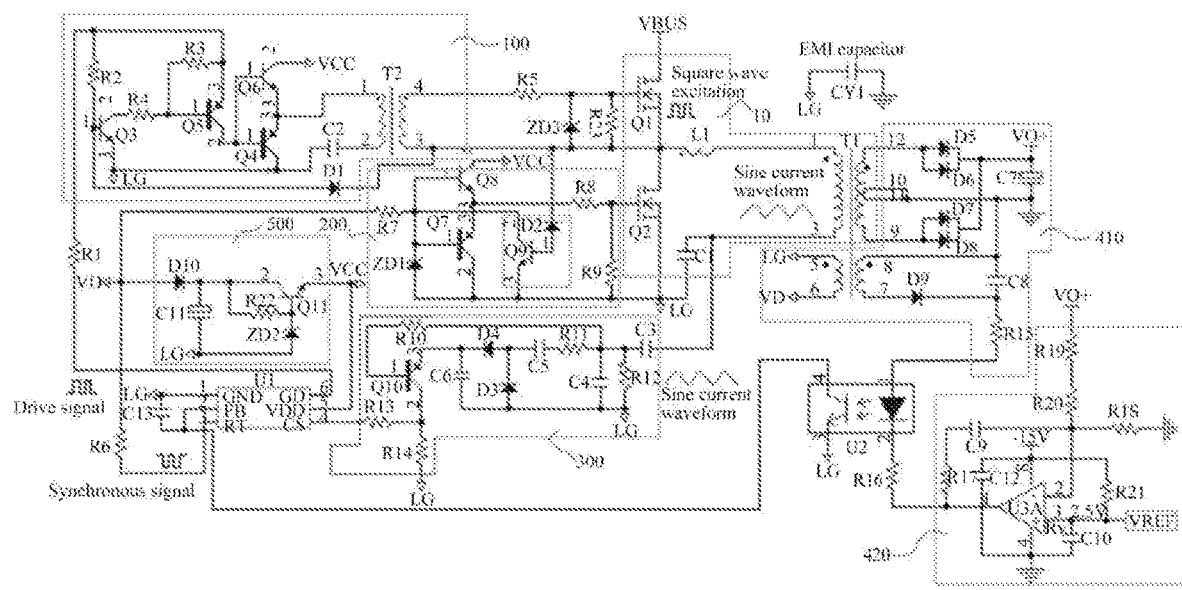

US 12,308,750 B2

LLC RESONANT TOPOLOGY CONTROL CIRCUIT BASED ON FLYBACK CHIP

TECHNICAL FIELD

The present disclosure relates to the technical field of LLC resonant control, in particular to an LLC resonant topology control circuit based on a flyback chip.

BACKGROUND

In a general product design, existing professional control chips are used to make LLC resonant circuits. The product design is completely limited by the chip itself. At present, LLC resonant circuits are rarely manufactured by using domestic chips and are all made in foreign semiconductor companies, so that these LLC resonant circuits are expensive and voluminous.

SUMMARY

The technical problem to be solved in the present disclosure is to provide an LLC resonant topology control circuit based on a flyback chip, which has low cost and small volume.

In order to achieve the objective of the present disclosure, the present disclosure adopts the following technical solution:

An LLC resonant topology control circuit based on a flyback chip includes an LLC resonant cavity, a current mode flyback chip U1, a first drive circuit, a second drive circuit, a charge pump circuit and a feedback circuit, wherein the LLC resonant cavity includes a switching transistor Q1, a switching transistor Q2, a resonant inductor L1, a resonant capacitor C1 and an output transformer T1; a drain of the switching transistor Q1 is connected to a VBUS end of a power supply; a source of the switching transistor Q1 is connected with a drain of the switching transistor Q2 and one end of the resonant inductor L1 respectively; the other end of the resonant inductor L1 is connected with one end of the resonant capacitor C1 through a primary coil of the output transformer T1, and the other end of the resonant capacitor C1 and a source of the switching transistor Q2 are connected with an LG end of the power supply;

a gate of the switching transistor Q1 is connected with an output end of the first drive circuit; an input end of the first drive circuit is connected with a GD end of the current mode flyback chip U1; a gate of the switching transistor Q2 is connected with an output end of the second drive circuit; an input end of the second drive circuit is connected with an RT end of the current mode flyback chip U1; one end of the resonant capacitor C1 is connected with a CS end of the current mode flyback chip U1 through the charge pump circuit; and a secondary coil of the output transformer T1 is connected with an input end of the feedback circuit, and an output end of the feedback circuit is connected with an FB end of the current mode flyback chip U1 through an optically coupled isolator U2.

Compared with the traditional LLC resonant control circuit, the LLC resonant topology control circuit based on the flyback chip provided by the present disclosure adopts the current mode flyback chip U1 to control LLC resonant topology. The chip has a small volume, which is much smaller than the chip package of the existing market. Furthermore, the chip has lower cost and flexible design, and the product competitiveness can be effectively improved.

The first drive circuit includes triodes Q3 to Q6, a transformer T2, a diode D1, a capacitor C2 and resistors R2 to R4; the GD end of the current mode flyback chip U1 is connected with one end of the resistor R2, one end of the resistor R3 and an emitter of the triode Q5 through a resistor R1; the other end of the resistor R2 is connected with a base of the triode Q3 and a positive pole of the diode D1 respectively; a collector of the triode Q3 is connected with the other end of the resistor R3 and a base of the triode Q5 respectively through the resistor R4; a collector of the triode Q5 is connected with a base of the triode Q4 and a base of the triode Q6 respectively; an emitter of the triode Q6 is connected with an emitter of the triode Q4 and one end of a primary coil of the transformer T2 respectively; the other end of the primary coil of the transformer T2 is connected with one end of the capacitor C2; one end of a secondary coil of the transformer T2 is connected with a gate of the switching transistor Q1 through the resistor R5; the other end of the secondary coil of the transformer T2 is respectively connected with a negative pole of the diode D1 and one end of the resonant inductor L1; the other end of the capacitor C2, a collector of the triode Q4 and an emitter of the triode Q3 are all connected with the LG end of the power supply; and a collector of the triode Q6 is connected with a VCC end of the power supply.

The second drive circuit includes triodes Q7 to Q9, a voltage stabilizing diode ZD1, a diode D2 and resistors R7 to R9; the RT end of the current mode flyback chip U1 is connected with one end of the resistor R7 through the resistor R6; the other end of the resistor R7 is respectively connected with a base of the triode Q7, a base of the triode Q8, a collector of the triode Q9 and a negative pole of the voltage stabilizing diode ZD1; an emitter of the triode Q8 is respectively connected with an emitter of the triode Q7 and one end of the resistor R8; a base of the triode Q9 is connected with one end of the resonant inductor L1 through the diode D2; the other end of the resistor R8 is connected with one end of the resistor R9 and a gate of the switching transistor Q2; the other end of the resistor R9, an emitter of the triode Q9, a collector of the triode Q7 and a positive pole of the voltage stabilizing diode ZD1 are all connected with the LG end of the power supply; and a collector of the triode Q8 is connected with the VCC end of the power supply.

In one embodiment, the charge pump circuit includes a triode Q10, diodes D3 to D4, capacitors C3 to C6, and resistors R10 to R14; one end of the resonant capacitor C1 is respectively connected with one end of the resistor R10, one end of the resistor R11, one end of the resistor R12 and one end of the capacitor C4 through the capacitor C3; the other end of the resistor R11 is respectively connected with a positive pole of the diode D4 and a negative pole of the diode D3 through the capacitor C5; the negative pole of the diode D4 is connected with one end of the capacitor C6 and an emitter of the triode Q10; a base of the triode Q10 is connected with the other end of the resistor R10; a collector of the triode Q10 is connected with one end of the resistor R13 and one end of the resistor R14; the other end of the resistor R13 is connected with the CS end of the current mode flyback chip U1; and the other end of the resistor R14, the other end of the resistor R12, the other end of the capacitor C4, the positive pole of the diode D3 and the other end of the capacitor C6 are all connected with the LG end of the power supply.

In one embodiment, the feedback circuit includes a rectifier power supply circuit and a sampling circuit.

The rectifier power supply circuit includes capacitors C7 to C8, diodes D5 to D9, and a resistor R15; one end of the secondary coil of the output transformer T1 is connected with a positive pole of the diode D5 and a positive pole of the diode D6; the other end of the secondary coil of the output transformer T1 is respectively connected with a positive pole of the diode D7 and a positive pole of the diode D8; an adjustment end of the secondary coil of the output transformer T1 is connected with one end of the capacitor C7 and one end of the capacitor C8; the other end of the capacitor C7 is respectively connected with a negative pole of the diode D5, a negative pole of the diode D6, a negative pole of the diode D7 and one end of a negative pole of the diode D8; and the other end of the capacitor C8 is connected with one input end of the optically coupled isolator U2 through the resistor R15.

The sampling circuit includes an operational amplifier U3A, capacitors C9 to C10, and resistors R17 to R21; the other input end of the optically coupled isolator U2 is connected with one end of the resistor R17 and an output end of the operational amplifier U3A through the resistor R16; the other end of the resistor R17 is respectively connected with one end of the resistor R18, one end of the resistor R20 and an inverting input end of the operational amplifier U3A through the capacitor C9; the other end of the resistor R20 is connected with the other end of the capacitor C7 through the resistor R19; a non-inverting input end of the operational amplifier U3A is connected with one end of the resistor R21 and one end of the capacitor C10; the other end of the resistor R21 is connected with a +15V power end; and the other end of the capacitor C10 and the other end of the resistor R18 are grounded.

In one embodiment, the LLC resonant topology control circuit based on the flyback chip further includes a power circuit; the power circuit includes a triode Q11, a voltage stabilizing diode ZD2, a capacitor C11, a diode D10 and a resistor R22; an emitter of the triode Q11 is the VCC end of the power supply; a base of the triode Q11 is respectively connected with one end of the resistor R22 and a negative pole of the voltage stabilizing diode ZD2; the other end of the resistor R22 is respectively connected with a collector of the triode Q11, one end of the capacitor C11 and a negative pole of the diode D10; a positive pole end of the diode D10 is the VD end of the power supply; and the other end of the capacitor C11 and a positive pole of the voltage stabilizing diode ZD2 are jointly connected to one point which is the LG end of the power supply.

In one embodiment, the current mode flyback chip U1 adopts an OB2263/8 series flyback chip.

BRIEF DESCRIPTION OF THE DRAWINGS

FIG. 1 is a schematic diagram of a circuit principle of an LLC resonant topology control circuit based on a flyback chip in one embodiment.

DETAILED DESCRIPTION OF THE EMBODIMENTS

In order to facilitate a understanding of the prevent invention, the present disclosure will be described more comprehensively below with reference to related accompanying drawings. Preferred embodiments of the present disclosure are illustrated in the drawings. However, the present disclosure can be embodied in many different forms, and is not limited to the embodiments described herein. Rather, these embodiments are provided so that the disclosed content of the present disclosure will be more thorough and complete.

Unless otherwise defined, all technical and scientific terms used herein are the same as meanings of general understandings of those skilled in the art of the present disclosure. The terms used in the description of the present disclosure herein are merely to describe the specific embodiments, not intended to limit the present disclosure.

In addition, the terms "first" and "second" are used for descriptive purposes only and are not to be understood to indicate or imply relative importance or to imply the number of indicated technical features. Therefore, features defined by "first" and "second" can explicitly instruct or impliedly include at least one feature.

Referring to FIG. 1, this embodiment provides an LLC resonant topology control circuit based on a flyback chip, including an LLC resonant cavity 10, a current mode flyback chip U1, a first drive circuit 100, a second drive circuit 200, a charge pump circuit 300 and a feedback circuit. The LLC resonant cavity includes a switching transistor Q1, a switching transistor Q2, a resonant inductor L1, a resonant capacitor C1 and an output transformer T1; a drain of the switching transistor Q1 is connected to a VBUS end of a power supply; a source of the switching transistor Q1 is connected with a drain of the switching transistor Q2 and one end of the resonant inductor L1 respectively; the other end of the resonant inductor L1 is connected with one end of the resonant capacitor C1 through a primary coil of the output transformer T1, and the other end of the resonant capacitor C1 and a source of the switching transistor Q2 are connected with an LG end of the power supply; a gate of the switching transistor Q1 is connected with an output end of the first drive circuit 100; an input end of the first drive circuit 100 is connected with a GD end of the current mode flyback chip U1; a gate of the switching transistor Q2 is connected with an output end of the second drive circuit 200; an input end of the second drive circuit 200 is connected with an RT end of the current mode flyback chip U1; one end of the resonant capacitor C1 is connected with a CS end of the current mode flyback chip U1 through the charge pump circuit 300; a secondary coil of the output transformer T1 is connected with an input end of the feedback circuit; and an output end of the feedback circuit is connected with an FB end of the current mode flyback chip U1 through an optically coupled isolator U2. Specifically, the current mode flyback chip U1 provided in this embodiment adopts an OB2263/8 series flyback chip.

In this embodiment, the first drive circuit 100 may include triodes Q3 to Q6, a transformer T2, a diode D1, a capacitor C2 and resistors R2 to R4; the GD end of the current mode flyback chip U1 is connected with one end of the resistor R2, one end of the resistor R3 and an emitter of the triode Q5 through a resistor R1; the other end of the resistor R2 is connected with a base of the triode Q3 and a positive pole of the diode D1 respectively; a collector of the triode Q3 is connected with the other end of the resistor R3 and a base of the triode Q5 respectively through the resistor R4; a collector of the triode Q5 is connected with a base of the triode Q4 and a base of the triode Q6 respectively; an emitter of the triode Q6 is connected with an emitter of the triode Q4 and one end of a primary coil of the transformer T2 respectively; the other end of the primary coil of the transformer T2 is connected with one end of the capacitor C2; one end of a secondary coil of the transformer T2 is connected with a gate of the switching transistor Q1 through the resistor R5; the other end of the secondary coil of the transformer T2 is respectively connected with a negative pole of the diode D1 and one end of the resonant inductor L1; the other end of the capacitor C2, a collector of the triode Q4 and an emitter of the triode Q3 are all connected with the LG end of the power supply; and a collector of the triode Q6 is connected with a VCC end of the power supply.

The second drive circuit 200 may include triodes Q7 to Q9, a voltage stabilizing diode ZD1, a diode D2 and resistors R7 to R9; the RT end of the current mode flyback chip U1 is connected with one end of the resistor R7 through the resistor R6; the other end of the resistor R7 is respectively connected with a base of the triode Q7, a base of the triode Q8, a collector of the triode Q9 and a negative pole of the voltage stabilizing diode ZD1; an emitter of the triode Q8 is respectively connected with an emitter of the triode Q7 and one end of the resistor R8; a base of the triode Q9 is connected with one end of the resonant inductor L1 through the diode D2; the other end of the resistor R8 is connected with one end of the resistor R9 and a gate of the switching transistor Q2; the other end of the resistor R9, an emitter of the triode Q9, a collector of the triode Q7 and a positive pole of the voltage stabilizing diode ZD1 are all connected with the LG end of the power supply; and a collector of the triode Q8 is connected with the VCC end of the power supply.

The charge pump circuit 300 may include a triode Q10, diodes D3 to D4, capacitors C3 to C6, and resistors R10 to R14; one end of the resonant capacitor C1 is respectively connected with one end of the resistor R10, one end of the resistor R11, one end of the resistor R12 and one end of the capacitor C4 through the capacitor C3; the other end of the resistor R11 is respectively connected with a positive pole of the diode D4 and a negative pole of the diode D3 through the capacitor C5; the negative pole of the diode D4 is connected with one end of the capacitor C6 and an emitter of the triode Q10; a base of the triode Q10 is connected with the other end of the resistor R10; a collector of the triode Q10 is connected with one end of the resistor R13 and one end of the resistor R14; the other end of the resistor R13 is connected with the CS end of the current mode flyback chip U1; and the other end of the resistor R14, the other end of the resistor R12, the other end of the capacitor C4, the positive pole of the diode D3 and the other end of the capacitor C6 are all connected with the LG end of the power supply.

The feedback circuit may include a rectifier power supply circuit 410 and a sampling circuit 420. The rectifier power supply circuit 410 may include capacitors C7 to C8, diodes D5 to D9, and a resistor R15. One end of the secondary coil of the output transformer T1 is connected with a positive pole of the diode D5 and a positive pole of the diode D6; the other end of the secondary coil of the output transformer T1 is respectively connected with a positive pole of the diode D7 and a positive pole of the diode D8; an adjustment end of the secondary coil of the output transformer T1 is connected with one end of the capacitor C7 and one end of the capacitor C8; the other end of the capacitor C7 is respectively connected with a negative pole of the diode D5, a negative pole of the diode D6, a negative pole of the diode D7 and one end of a negative pole of the diode D8; the other end of the capacitor C8 is connected with one input end of the optically coupled isolator U2 through the resistor R15; the sampling circuit 420 includes an operational amplifier U3A, capacitors C9 to C10, and resistors R17 to R21; the other input end of the optically coupled isolator U2 is connected with one end of the resistor R17 and an output end of the operational amplifier U3A through the resistor R16; the other end of the resistor R17 is respectively connected with one end of the resistor R18, one end of the resistor R20 and an inverting input end of the operational amplifier U3A through the capacitor C9; the other end of the resistor R20 is connected with the other end of the capacitor C7 through the resistor R19; a non-inverting input end of the operational amplifier U3A is connected with one end of the resistor R21 and one end of the capacitor C10; the other end of the resistor R21 is connected with a +15V power end; and the other end of the capacitor C10 and the other end of the resistor R18 are grounded.

Further, the LLC resonant topology control circuit based on a flyback chip provided by this embodiment further includes a power circuit 500. The power circuit 500 includes a triode Q11, a voltage stabilizing diode ZD2, a capacitor C11, a diode D10 and a resistor R22; an emitter of the triode Q11 is the VCC end of the power supply; a base of the triode Q11 is respectively connected with one end of the resistor R22 and a negative pole of the voltage stabilizing diode ZD2; the other end of the resistor R22 is respectively connected with a collector of the triode Q11, one end of the capacitor C11 and a negative pole of the diode D10; a positive pole end of the diode D10 is the VD end of the power supply; and the other end of the capacitor C11 and a positive pole of the voltage stabilizing diode ZD2 are jointly connected to one point which is the LG end of the power supply.

The LLC resonant topology control circuit based on a flyback chip provided by this embodiment includes the LLC resonant cavity 10, the current mode flyback chip U1, the first drive circuit 100, the second drive circuit 200, the charge pump circuit 300 and the feedback circuit. The LLC resonant topology control circuit works synchronously at an operating frequency of a feedback circuit of the LLC resonant cavity 10 through the resistor R6 by virtue of a frequency setting pin of the current mode flyback chip U1. The charge pump circuit 300 includes the triode Q10, the diodes D3 to D4, the capacitors C3 to C6 and the resistors R10 to R14 to complete current-voltage conversion. The charge pump divides the current of the resonant capacitor C1 via the capacitor C3. When the LLC resonant cavity 10 has much energy, the voltage of the resonant capacitor C1 increases. The voltage of the diode D3/D4 also increases after rectification and exceeds a protection threshold set by the CS end of the current mode flyback chip U1. Furthermore, if the voltage of the resonant capacitor C1 in the LLC resonant cavity 10 decreases to be less than 0 and becomes negative, the triode Q10 is turned on, and the CS end of the current mode flyback chip U1 performs cycle by cycle overcurrent protection (OCP), thus triggering overpower protection. The power circuit 500 in this embodiment includes the triode Q11, the voltage stabilizing diode ZD2, the capacitor C11, the diode D10 and the resistor R22, so as to form a voltage stabilizing circuit to supply power to the current mode flyback chip U1. The diode D9 and the capacitor C8 supply power to the feedback circuit. The feedback circuit composed of the operational amplifier U3A controls an output voltage of the current mode flyback chip U1 through the optically coupled isolator U2.

An operation startup mechanism: The current mode flyback chip U1 is powered on and sends a drive signal. After the drive signal passes through the resistor R1, the drive transformer T2 is pushed by the triodes Q4 and Q6 to drive the switching transistor Q1 in an upper bridge arm to be turned on. The LLC resonant cavity 10 starts to work. The VD is reversely biased and turned off. After the second half cycle, the VD is positive. The VD drives, through the resistor R7, the switching transistor Q2 in a lower bridge arm to be turned on. The triode Q3 and the diode D1, as well as the triode Q9 and the diode D2, are self-locked to prevent direct connection between the switching transistors Q1 and Q2 in the resonant cavity.

The key of the LLC resonant topology control circuit based on a flyback chip provided by this embodiment is an operation startup and protection mechanism. For the startup, only the upper bridge arm is controlled. The lower bridge arm is self-excited and driven by the transformer T2. For the protection, the triode Q3 and the diode D1, as well as the triode Q9 and the diode D2, achieve interlocking of drive signals to prevent direct connection. The OCP in the LLC resonant cavity 10 is achieved by the triode Q10 and the charge pump.

Compared with the traditional LLC resonant control circuit, the LLC resonant topology control circuit based on the flyback chip provided by this embodiment adopts the current mode flyback chip U1 to control LLC resonant topology. The chip has a small volume, which is much smaller than the chip package of the existing market. Furthermore, the chip has lower cost and flexible design, and the product competitiveness can be effectively improved.

The technical features of the embodiments described above can be arbitrarily combined. In order to make the description concise, all possible combinations of various technical features in the above embodiments are not completely described. However, the combinations of these technical features should be considered as the scope described in this specification as long as there is no contradiction in them.

The above-mentioned embodiments only express several implementation modes of the present disclosure, and their descriptions are more specific and detailed, but they cannot be understood as limiting the patent scope of the present disclosure. It should be noted that those of ordinary skill in the art can further make various transformations and improvements without departing from the concept of the present disclosure, and these transformations and improvements all fall within the protection scope of the present disclosure. Therefore, the protection scope of the patent of the present disclosure shall be subject to the appended claims.

What is claimed is:

1. An LLC resonant topology control circuit based on a flyback chip, comprising an LLC resonant cavity, a current mode flyback chip (U1), a first drive circuit, a second drive circuit, a charge pump circuit and a feedback circuit, wherein the LLC resonant cavity comprises a switching transistor (Q1), a switching transistor (Q2), a resonant inductor (L1), a resonant capacitor (C1) and an output transformer (T1); a drain of the switching transistor (Q1) is connected to a VBUS end of a power supply; a source of the switching transistor (Q1) is connected with a drain of the switching transistor (Q2) and one end of the resonant inductor (L1) respectively; the other end of the resonant inductor (L1) is connected with one end of the resonant capacitor (C1) through a primary coil of the output transformer (T1), and the other end of the resonant capacitor (C1) and a source of the switching transistor (Q2) are connected with an LG end of the power supply;

a gate of the switching transistor (Q1) is connected with an output end of the first drive circuit; an input end of the first drive circuit is connected with a GD end of the current mode flyback chip (U1); a gate of the switching transistor (Q2) is connected with an output end of the second drive circuit; an input end of the second drive circuit is connected with an RT end of the current mode flyback chip (U1); an input end of the second drive circuit is connected with a different end VD of an auxiliary winding of the transformer (T1) through a resistor (R6); one end of the resonant capacitor (C1) is connected with a CS end of the current mode flyback chip (U1) through the charge pump circuit; a secondary coil of the output transformer (T1) is connected with an input end of the feedback circuit, and an output end of the feedback circuit is connected with an FB end of the current mode flyback chip (U1) through an optically coupled isolator (U2);

the first drive circuit comprises triodes (Q3) to (Q6), a transformer (T2), a diode (D1), a capacitor (C2) and resistors (R2) to (R4); the GD end of the current mode flyback chip (U1) is connected with one end of the resistor (R2), one end of the resistor (R3) and an emitter of the triode (Q5) through a resistor (R1); the other end of the resistor (R2) is connected with a base of the triode (Q3) and a positive pole of the diode (D1) respectively; a collector of the triode (Q3) is connected with the other end of the resistor (R3) and a base of the triode (Q5) respectively through the resistor (R4); a collector of the triode (Q5) is connected with a base of the triode (Q4) and a base of the triode (Q6) respectively; an emitter of the triode (Q6) is connected with an emitter of the triode (Q4) and one end of a primary coil of the transformer (T2) respectively; the other end of the primary coil of the transformer (T2) is connected with one end of the capacitor (C2); one end of a secondary coil of the transformer (T2) is connected with a gate of the switching transistor (Q1) through the resistor (R5); the other end of the secondary coil of the transformer (T2) is respectively connected with a negative pole of the diode (D1) and one end of the resonant inductor (L1); the other end of the capacitor (C2), a collector of the triode (Q4) and an emitter of the triode (Q3) are all connected with the LG end of the power supply; a collector of the triode (Q6) is connected with a VCC end of the power supply;

the second drive circuit comprises triodes (Q7) to (Q9), a voltage stabilizing diode (ZD1), a diode (D2) and resistors (R7) to (R9); the RT end of the current mode flyback chip (U1) is connected with one end of the resistor (R7) through the resistor (R6); the other end of the resistor (R7) is respectively connected with a base of the triode (Q7), a base of the triode (Q8), a collector of the triode (Q9) and a negative pole of the voltage stabilizing diode (ZD1); an emitter of the triode (Q8) is respectively connected with an emitter of the triode (Q7) and one end of the resistor (R8); a base of the triode (Q9) is connected with one end of the resonant inductor (L1) through the diode (D2); the other end of the resistor (R8) is connected with one end of the resistor (R9) and a gate of the switching transistor (Q2); the other end of the resistor (R9), an emitter of the triode (Q9), a collector of the triode (Q7) and a positive pole of the voltage stabilizing diode (ZD1) are all connected with the LG end of the power supply; and a collector of the triode (Q8) is connected with the VCC end of the power supply.

2. The LLC resonant topology control circuit based on the flyback chip according to claim 1, wherein the charge pump circuit comprises a triode (Q10), diodes (D3) to (D4), capacitors (C3) to (C6), and resistors (R10) to (R14); one end of the resonant capacitor (C1) is respectively connected with one end of the resistor (R10), one end of the resistor (R11), one end of the resistor (R12) and one end of the capacitor (C4) through the capacitor (C3); the other end of the resistor (R11) is respectively connected with a positive pole of the diode (D4) and a negative pole of the diode (D3) through the capacitor (C5); the negative pole of the diode (D4) is connected with one end of the capacitor (C6) and an emitter of the triode (Q10); a base of the triode (Q10) is connected with the other end of the resistor (R10); a collector of the triode (Q10) is connected with one end of the resistor (R13) and one end of the resistor (R14); the other end of the resistor (R13) is connected with the CS end of the current mode flyback chip (U1); and the other end of the resistor (R14), the other end of the resistor (R12), the other end of the capacitor (C4), the positive pole of the diode (D3) and the other end of the capacitor (C6) are all connected with the LG end of the power supply.

3. The LLC resonant topology control circuit based on the flyback chip according to claim 1, wherein the feedback circuit comprises a rectifier power supply circuit and a sampling circuit, wherein the rectifier power supply circuit comprises capacitors (C7) to (C8), diodes (D5) to (D9), and a resistor (R15); one end of the secondary coil of the output transformer (T1) is connected with a positive pole of the diode (D5) and a positive pole of the diode (D6); the other end of the secondary coil of the output transformer (T1) is respectively connected with a positive pole of the diode (D7) and a positive pole of the diode (D8); an adjustment end of the secondary coil of the output transformer (T1) is connected with one end of the capacitor (C7) and one end of the capacitor (C8); the other end of the capacitor (C7) is respectively connected with a negative pole of the diode (D5), a negative pole of the diode (D6), a negative pole of the diode (D7) and one end of a negative pole of the diode (D8); the other end of the capacitor (C8) is connected with one input end of the optically coupled isolator (U2) through the resistor (R15);

the sampling circuit comprises an operational amplifier (U3A), capacitors (C9) to (C10), and resistors (R17) to (R21); the other input end of the optically coupled isolator (U2) is connected with one end of the resistor (R17) and an output end of the operational amplifier (U3A) through the resistor (R16); the other end of the resistor (R17) is respectively connected with one end of the resistor (R18), one end of the resistor (R20) and an inverting input end of the operational amplifier (U3A) through the capacitor C9 capacitor (C9); the other end of the resistor (R20) is connected with the other end of the capacitor (C7) through the resistor (R19); a non-inverting input end of the operational amplifier (U3A) is connected with one end of the resistor (R21) and one end of the capacitor (C10); the other end of the resistor (R21) is connected with a +15V power end; and the other end of the capacitor (C10) and the other end of the resistor (R18) are grounded.

4. The LLC resonant topology control circuit based on the flyback chip according to claim 1, further comprising a power circuit, wherein the power circuit comprises a triode (Q11), a voltage stabilizing diode (ZD2), capacitor (C11), diode (D10) and a resistor (R22); an emitter of the triode (Q11) is the VCC end of the power supply; a base of the triode (Q11) is respectively connected with one end of the resistor (R22) and a negative pole of the voltage stabilizing diode (ZD2); the other end of the resistor (R22) is respectively connected with a collector of the triode (Q11), one end of the capacitor (C11) and a negative pole of the diode (D10); a positive pole end of the diode (D10) is the VD end of the power supply; and the other end of the capacitor (C11) and a positive pole of the voltage stabilizing diode (ZD2) are jointly connected to one point which is the LG end of the power supply.

* * * * *